Patented Nov. 30, 1937

2,100,974

UNITED STATES PATENT OFFICE 2,100,974

SOLDERING PREPARATION

Raymond F. Neilson, Detroit, Mich.

No Drawing. Application July 24, 1935,
Serial No. 32,876

2 Claims. (Cl. 148—25)

This invention relates to soldering preparations, commonly known as fluxes, employed in connection with the process of soldering metals, with lead-tin, or equivalent, soldering alloys or mixtures.

The principal object of the invention is to improve the art of soldering.

Other objects of the invention are to provide a self-cleaning soldering flux which will thoroughly wet the surface of metals to be soldered which, when employed in conjunction with a lead-tin solder will effect better tinning; which will clean such surfaces by removing greases, oils, rust, metal oxides or other corrosion or other foreign products; and will etch such metal surfaces so as to afford tooth thereto in order to effect a better bond between the solder and the metal to which it is applied.

Other objects, features and advantages, will become apparent from the following description and appended claims.

It has been common practice to employ a flux in uniting metal surfaces by heat. In soldering especially, difficulty has been experienced in causing the fluxes thoroughly to wet and to adhere, so that intimate contact between the solder and metal or metals to which it is to be joined may be obtained. This difficulty is due to such factors as oils and greases, rust or other corrosion products, dirt, and similar foreign materials present upon the surfaces of the metal or metals to which the solder is applied.

According to one aspect, the present invention involves the use of a metallic chloride or chlorides or materials capable of forming a metallic chloride, a metal etching acid capable of removing oxides, rust or other corrosion products, an effective oil and grease solvent, and preferably diluents in sufficient amounts to obtain the desired consistency of the soldering preparation.

Oils and greases are usually present on metal surfaces to be soldered and have to be dissolved or emulsified and floated or washed off from such surfaces in order that the soldering preparation or flux will be caused properly to wet and to adhere to the surfaces. The ether derivatives of the ethylene glycols have been found particularly effective as grease and oil solvents in soldering preparations. The monoethyl ether of ethylene glycol is completely miscible in water, is in general a good solvent for greases and oils, and is a comparatively cheap material. The monobutyl ether of ethylene glycol is likewise completely miscible with water and where the oils and greases encountered are largely of the mineral type, a part or all of the monoethyl ether of ethylene glycol may be replaced by the monobutyl ether of ethylene glycol. The monobutyl ether of ethylene glycol is particularly effective in dissolving mineral oils and greases. Monobutyl ether of di-ethylene glycol is miscible in water and oils and is an excellent solvent for rosin and rosin oils. Monoethyl ether of diethylene glycol is miscible in water and is a solvent for rosin and rosin oils, but is somewhat less effective as a grease and oil solvent.

The metallic chlorides such as zinc and ammonium chloride are commonly employed as fluxing agents in soldering preparations and one or more are generally employed in the present instance.

Hydrochloric acid, also commonly employed in soldering preparations, is used in the present instance to etch the metal surfaces and to break up rust formation or other corrosion products of foreign material upon the metal surfaces to be treated. Where galvanized iron is to be soldered, the zinc chloride may be omitted as the hydrochloric acid acting on the zinc coating would produce a sufficient amount of metallic chloride.

Ethyl alcohol, either in pure or denatured form is employed as a diluent and surface tension reducing agent. Water is also preferably employed as a diluent and solvent for the metallic chloride or chlorides. Surface tension reducing agents such as soap-like glucosides of vegetable derivation and monocarboxylic acids of the olefin series, saponin and oleic acid being examples of such agents, may also be employed.

An example of a soldering preparation which has been found to afford excellent results as a fluxing material has approximately the following formula:

| | |
|---|---|
| Zinc chloride | grams 150 |
| Ammonium chloride | do 20 |
| Hydrochloric acid 28.5% 18° Bé | cu. centimeters 270 |
| Ethyl alcohol | grams 65 |
| Monoethyl or monobutyl ether of ethylene glycol | do 50 |
| Water | do 50 |

When metals to be joined are non-ferrous in character, the proportional amount of hydrochloric acid may be reduced. If the metal surfaces to be joined are comparatively free of oils and greases, the ether derivative or derivatives of the ethylene or diethylene glycols, employed as solvents, may be reduced.

As many changes could be made in the above soldering preparation and many apparently widely different constituents and proportions thereof could be employed without departing from the spirit of this invention, it is intended that all matter contained in the above description shall be interpreted as illustrative and not in a limiting sense.

What is claimed is:

1. A soldering preparation comprising a metallic chloride, a metal etching acid, monobutyl ether of ethylene glycol, and a surface tension reducing agent selected from a group of substances consisting of soap-like glucosides of vegetable derivation and monocarboxylic acids of the olefin series.

2. A soldering preparation consisting of a metallic chloride, a metal etching acid, a monoalkyl ether derivative of ethylene glycol, and a surface tension reducing agent selected from a group of substances consisting of soap-like glucosides of vegetable derivation and monocarboxylic acids of the olefin series.

RAYMOND F. NEILSON.